(No Model.)

H. C. WEEDEN.
TRAP.

No. 390,634. Patented Oct. 2, 1888.

WITNESSES.
J. Henry Taylor
E. B. Tomlinson

INVENTOR.
H. C. Weeden
by Alex. P. Browne,
attorney.

UNITED STATES PATENT OFFICE.

HENRY C. WEEDEN, OF BOSTON, MASSACHUSETTS, ASSIGNOR TO THE WEEDEN SANITARY MANUFACTURING COMPANY, OF RHODE ISLAND.

TRAP.

SPECIFICATION forming part of Letters Patent No. 390,634, dated October 2, 1888.

Application filed February 26, 1887. Serial No. 229,001. (No model.)

*To all whom it may concern:*

Be it known that I, HENRY C. WEEDEN, of Boston, in the county of Suffolk and State of Massachusetts, a citizen of the United States, have invented certain new and useful Improvements in Traps, of which the following is a specification.

My invention relates to plumbers' traps for use in connection with bath-tubs, bowls, and other water-fixtures; and it has for its object to furnish improvements in the construction of such traps, whereby the water seal which they provide shall be secured against being removed either by siphonage or by back-pressure.

In carrying out my invention I form what I may designate as a "float-chamber," which connects with the trap at some point above and on the sewer side of the lowest part of its seal. I also so arrange the connection between this float-chamber and the trap that the latter shall enter it and leave it by distinct orifices formed in the float-chamber, as will be hereinafter more fully explained. Within the float-chamber I provide a floating valve, and I extend the float-chamber vertically to a height such that when water is passing through the trap and float-chamber under ordinary circumstances the water-level in the float-chamber shall be such that the floating valve shall be far enough above the discharge-orifice of the float-chamber to be free from liability of closing it by reason of suction. I also prefer, although, as will appear, it is not essential to the operation of the apparatus, to make the float-chamber closed at the upper end.

Figure 1:
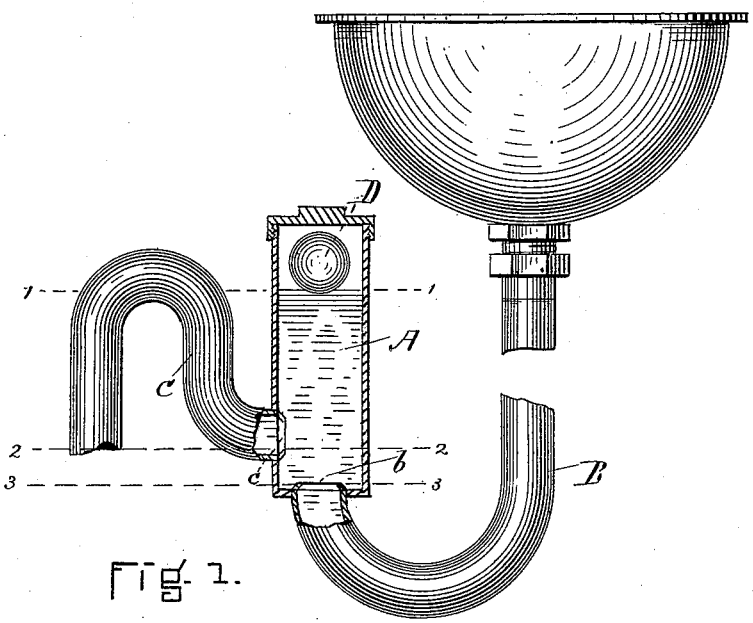

In the accompanying drawings I have represented in vertical section at Figure 1 my present improvement as applied to a trap of the so-called "S" or "siphon" form. At Fig. 2 I have in the same manner illustrated its application to the so-called "bottle-trap," which I consider to be in substance a siphon-trap having a bottle-formed enlargement, including a portion of its seal. My improvement may also be made use of in connection with other forms of trap than those illustrated herein.

In the drawings, A represents a float-chamber embodying my present invention. This float-chamber connects by means of distinct orifices $b\ c$ with the portions B C of the trap at a point above the lowest portion of its dip and on the sewer side thereof. Within the float-chamber is the float-valve D. This I prefer to form of a rubber ball, and it and the orifices $b\ c$ are relatively so constructed that the valve D when resting upon either orifice will close it.

I will now proceed to describe the operation of the device. In the drawings the water is represented as standing in the trap and float-chamber at the level marked 1, which should be sufficiently high above the orifice $c$ that the float-valve D will be out of the way of the effect of suction in the ordinary operation of discharging water through the trap. Assuming now that siphonage should take place, the water in the trap and float-chamber will be lowered until the valve D closes the orifice $c$, thereby preventing the further escape of water and maintaining the trap seal at the level marked 2 in the drawings. The valve will continue to close the orifice so long as the out-draft toward the sewer continues. Assuming that back-pressure is set up for any cause from the sewer toward the house, the water in the trap will be forced backwardly through the orifice $b$ until it is sunk to the level marked 3. At this point, however, the valve D closes the orifice and prevents any further dislodgment of the water seal. In like manner as before the valve is free to leave the orifice as soon as the disturbing pressure is removed.

To obtain the best results, the orifices $b\ c$ of the float-chamber should be at different levels, as shown in the drawings, the former a little lower than the latter.

Figure 2:
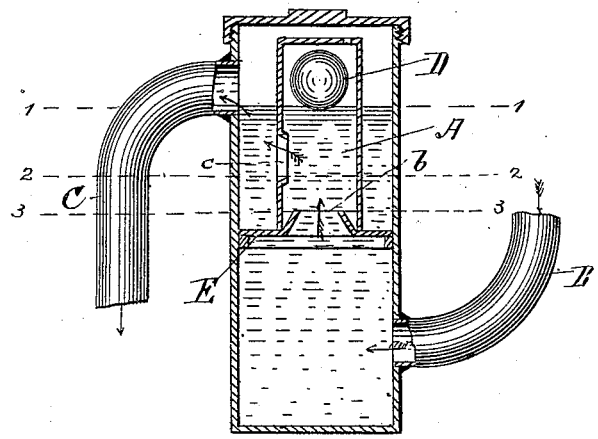

A convenient method of applying my improvement to a bottle-trap is shown in Fig. 2, in which the chamber A is placed within the trap, which is also provided with a partition, E, between the lower portion of the bottle, where the pipe from the fixture enters, and the upper portion, from which the pipe to the sewer leads out. This partition being water-tight, the only connection between the two portions of the bottle-trap is through the chamber A. With this construction advantage is found in the fact that the considerable body of water ordinarily standing in the bottle is by reason of its weight or inertia a greater safeguard against slight siphonage or back-pressure than the comparatively small body of water contained in an S-trap, while the presence of the partition causes the whole flow of water through the trap to pass through the float-chamber, which with its valve will operate to prevent the dislodgment of the water seal by either siphonage or back-pressure, however severe.

I am aware that it is not broadly new to provide traps with valves intended to prevent siphonage and back-pressure. I am not, however, aware that this has heretofore been done in the manner described by me.

I claim—

The combination of the trap inlet and discharge pipes, a goose-neck beyond the valve-chamber, extending above the valve-seat, the valve-chamber having two openings in its lower part, and a floating valve which seats below the normal water-line in the goose neck, substantially as set forth.

In testimony whereof I have hereunto subscribed my name this 23d day of February, A. D. 1887.

HENRY C. WEEDEN.

Witnesses:
J. HENRY TAYLOR,
E. B. TOMLINSON.